United States Patent [19]

Iwazaki et al.

[11] Patent Number: 5,040,480
[45] Date of Patent: Aug. 20, 1991

[54] INDICATOR

[75] Inventors: Minoru Iwazaki, Shimada; Noriaki Ohta; Hiroyasu Shiratori, both of Shizuoka, all of Japan

[73] Assignee: Yazaki Corporation, Japan

[21] Appl. No.: 489,197

[22] Filed: Mar. 6, 1990

[30] Foreign Application Priority Data

Mar. 8, 1989 [JP] Japan .............................. 1-25554[U]
Mar. 17, 1989 [JP] Japan .............................. 1-29872[U]

[51] Int. Cl.$^5$ ............................................. G01D 13/20
[52] U.S. Cl. ................................... 116/286; 116/304; 116/328; 116/DIG. 36; 250/463.1
[58] Field of Search ................... 116/286-288, 116/227-332, 334, 335, DIG. 6, DIG. 35, DIG. 36; 40/543; 250/463.1; 362/34, 84; 368/226

[56] References Cited

U.S. PATENT DOCUMENTS

| 911,401 | 2/1909 | Junghans | 116/332 |
| 2,428,792 | 10/1947 | Evans | 250/463.1 |
| 2,680,813 | 6/1954 | Doyle | 40/543 |
| 3,245,375 | 4/1966 | Fiedler et al. | 116/334 |
| 3,499,417 | 3/1970 | Heinke | 116/335 |
| 4,536,656 | 8/1985 | Sowa | 250/463.1 |
| 4,841,155 | 6/1989 | Ushida et al. | 250/463.1 |
| 4,991,537 | 2/1991 | Muramatsu | 116/286 |

FOREIGN PATENT DOCUMENTS 0345727 12/1989 European Pat. Off. ............ 116/286
333991 1/1936 Italy .................................... 116/328

Primary Examiner—William A. Cuchlinski, Jr.
Assistant Examiner—W. Morris Worth
Attorney, Agent, or Firm—Wigman & Cohen, P.C.

[57] ABSTRACT

Disclosed is an indicator which includes a scale plate having a ground color, a pointer rotatably mounted on the scale plate and indicia such as numerals and scales arranged on the scale plate for indicating a specific value in cooperation with the pointer. The pointer includes an upper surface on which a fluorescent part having fluorescent brightener therein is formed, and the area of the fluorescent part of the pointer is smaller than that of the upper surface of the pointer. Each of the indicia has a contour defined by a normal ink having a different color from the ground color of the scale plate and a fluorescent part having fluorescent brightener therein formed in the contour of each indicia. The area of the fluorescent part of the indicia is smaller than that of the indicia. This indicator further includes an unltraviolet light source for illuminating the fluorescent parts of the pointer and the indicia so as to fluoresce only when the ultraviolet light source is turned on, whereby suppressing that the indicia and pointer become too bright and distracting for a driver when illuminated by the ultraviolet light source.

11 Claims, 3 Drawing Sheets

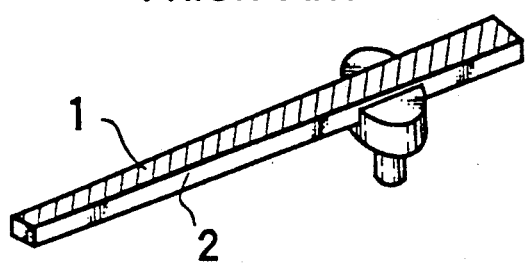
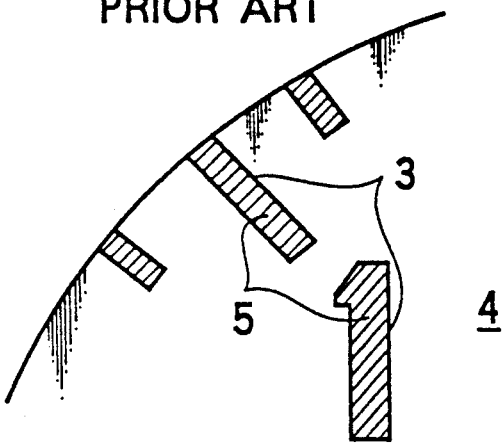
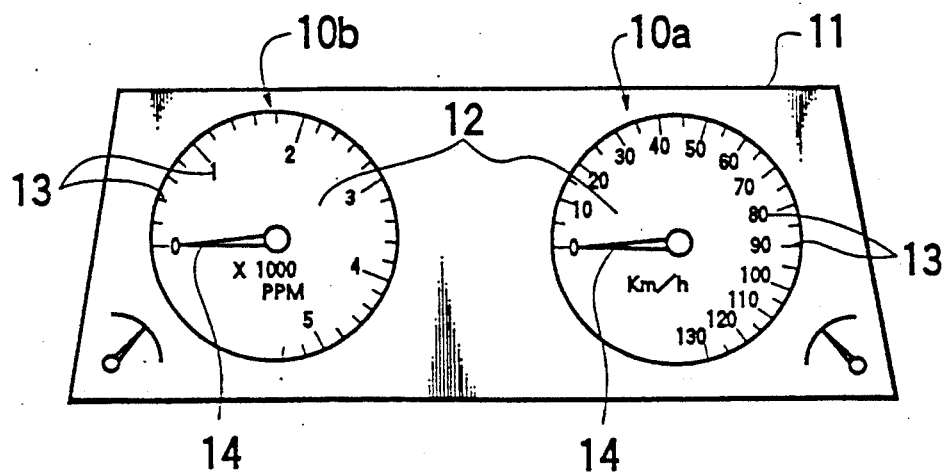
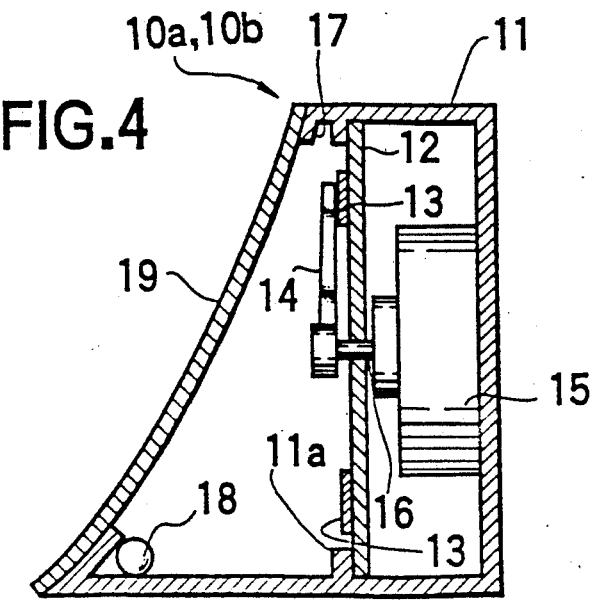

INDICATOR

BACKGROUND OF THE INVENTION

1. Field of the Invention

This invention relates to an indicator, and more particularly to an indicator such as a speedmeter or tachometer used in motor vehicles, which has an ultraviolet lamp for illuminating indicia, such as scales and numerals arranged on a scale plate of the indicator, containing fluorescent brightener therein and a pointer on which fluorescent brightener is applied for visibility improvement.

2. Description of the Prior Art

One type of prior art indicators, such as a speed meter or tachometer for use in motor vehicles, includes an ultraviolet lamp for illuminating indicia, such as scales or numerals, that contain fluorescent brightener therein, and a pointer on which fluorescent brightener is applied for indicating a specific value in cooperation with the indicia. In such a conventional indicator, the fluorescent brightener fluoresce when the indicia and the pointer receive ultraviolet light from the ultraviolet lamp. Therefore, the luminance of the indicia and pointer becomes good when the ultraviolet lamp is turned on, which makes the indicia and pointer especially visible at night.

However, in the conventional indicator, the fluorescent brightener is simply added directly to the indicia on the scale plate or simply applied onto an upper surface of the pointer. Namely, according to the conventional indicator, as shown in FIG. 1, fluorescent brightener 1 is applied onto a whole upper surface of a pointer 2. Further, as shown in FIG. 2, indicia 3 such as scales and numerals are printed on a scale plate 4 by an ink 5 having a different color from a ground color of the scale plate 4 and containing fluorescent brightener therein. Therefore, there is a problem that the pointer 2 and indicia 3 are too bright and distracting for a driver when illuminated by the ultraviolet lamp. As a result, the driver's night-time visibility and concentration may be dangerously impaired. This means that the sizes of the indicia and the upper surface of the pointer, although they give good visibility for a driver under day-light, are too large if fluorescent brightener is simply applied thereto and then an ultraviolet light is illuminated therefor under darkness.

SUMMARY OF THE INVENTION

In view of the conventional indicator, an object of the present invention is to provide an indicator having an ultraviolet lamp for illuminating indicia printed in ink containing fluorescent brightener and a pointer on which fluorescent brightener is applied, which can suppress the exceeding bright and distracting of the indicia and pointer when illuminated by the ultraviolet lamp, thus providing more suitable visibility at night-time to a driver.

In order to achieve the object, an indicator according to the present invention comprises a scale plate having a certain ground color, a pointer rotatably mounted on the scale plate and indicia such as numerals and scales arranged on the scale plate for indicating a specific value in cooperation with the pointer. The pointer includes an upper surface on which a fluorescent part having fluorescent brightener therein is formed, and the area of the fluorescent part of the pointer is smaller than that of the upper surface of the pointer. Each of the indicia has a contour defined by a normal ink having a different color from the ground color of the scale plate and a fluorescent part having fluorescent brightener therein is formed within the contour of each indicia. The area of the fluorescent part of the indicia is smaller than that of the indicia. This indicator further includes an ultraviolet light source for illuminating the fluorescent parts of the pointer and the indicia so as to fluoresce only when the ultraviolet light source is turned on, whereby suppressing that the indicia and pointer become too bright and distracting for a driver when illuminated by the ultraviolet light source.

According to the indicator having the above structure, since each area of the fluorescent parts of the pointer and the indicia is smaller than each area of the upper surface of the pointer and the indicia, respectively, suitable visibility will be obtained when the ultraviolet light source is turned on during the night-time.

The objects and advantages of the present invention, as well as the details of the preferred embodiments will be more fully understood when taken in conjunction with the following drawings.

BRIEF DESCRIPTION OF THE DRAWINGS

FIG. 1 is a perspective view of a pointer according to the prior art;

FIG. 2 is a plan view of indicia arranged on a scale plate according to the prior art;

FIG. 3 is a schematic front view of indicators according to the present invention;

FIG. 4 is a cross-sectional view of the indicator according to the present invention;

DETAILED DESCRIPTION OF THE PREFERRED EMBODIMENTS

Figure 5:
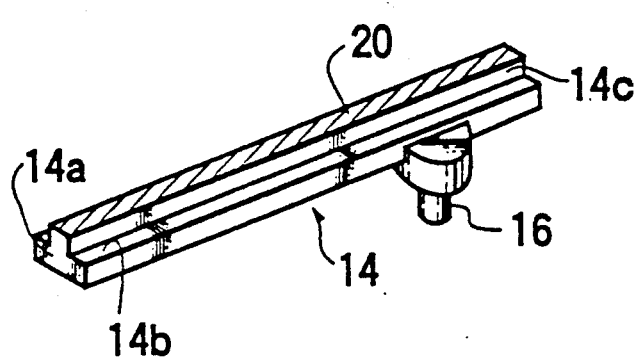
FIG. 5 is a perspective view of one embodiment of a pointer according to the present invention.

Referring now to the accompanying drawings, preferred embodiments of the present invention will be described.

FIG. 3 shows indicators 10a, 10b, such as speedmeter and tachometer for use in motor vehicles or the like. In the drawing, the reference numeral 11 denotes a casing in which the indicators 10a and 10b are accommodated. Each of the indicators 10a and 10b has a scale plate 12 having a certain ground color, especially black. On the scale plate 12, there are arranged indicia 13 such as scales or numerals along the circumferential direction thereof. On the center of the scale plate, there is rotatably provided a pointer 14 which indicates a specific value in cooperation with the indicia 13.

FIG. 4 shows a cross-sectional view of the indicator 10a or 10b. As shown in the drawing, in the casing 11, there is disposed a movement 15 of the indicator. On the front portion of the movement 15, there is provided the scale plate 12. The pointer 14 which is rotatably disposed on the front side of the scale plate 12 is operatively connected through a shaft 16 to the movement 15. On the front open end 11a of the casing 11, there is formed a hood 17 having a substantially cylindrical shape so as to allow sight of the scale plate 12 therethrough from the outside. On the inner lower portion of the hood 17, there is disposed an ultraviolet light source such as an ultraviolet lamp 18 for illuminating the scale plate 12, especially the indicia 13 and the pointer 14. Further, on the front side of the hood 17, there is provided a transparent front cover 19.

FIG. 5 shows one embodiment of the present invention. In this embodiment, a pointer 14 which is rotatably supported by the shaft 16 comprises a longitudinal needle-like base member 14a formed of an aluminum or the like. The needle-like base member 14a has a substantially plate-like shape with a flat upper surface 14b. On the upper surface 14b of the pointer 14, there is integrally formed a longitudinal convex protrusion 14c, whose width in cross direction is narrower than that of the base member 14a of the pointer 14.

Figure 6:
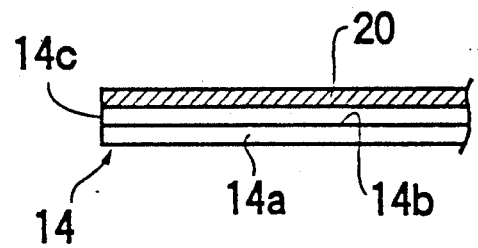
FIG. 6 is a cross-sectional view of a main part of the pointer of FIG. 5.

On the top surface of the convex protrusion 14c of the pointer 14, as clearly shown in FIG. 6, there is formed a fluorescent part 20. The fluorescent part 20 is made of a coating which contains fluorescent brightener having the same color as that of the material of the pointer 14. The coating is applied onto the top surface of the convex protrusion 14c by means of a hot-stump or a painting.

Figure 7:
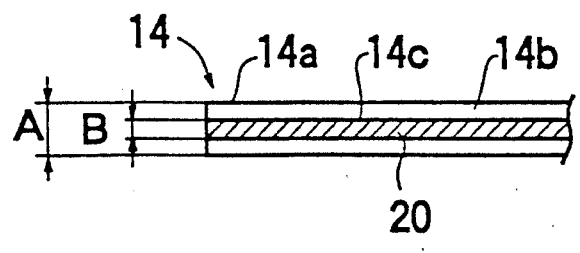
FIG. 7 is a top plan view of a main part of the pointer of FIG. 5.

Therefore, as clearly illustrated in FIG. 7, the width of the fluorescent part 20 which is represented by a letter "B" is narrower than that of the upper surface 14b of the pointer 14 which is represented by a letter "A".

Figure 8:
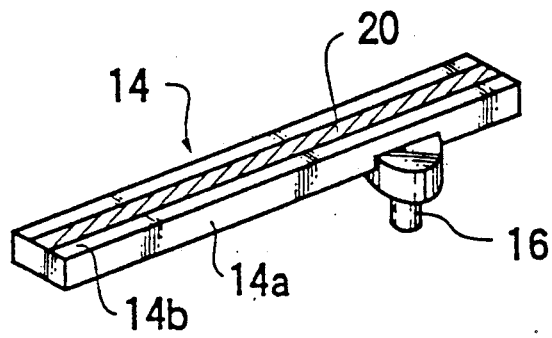
FIG. 8 is a perspective view of another embodiment of a pointer according to the present invention.

FIG. 8 shows another embodiment of the present invention. In this embodiment, a fluorescent part 20 which comprises a coating containing fluorescent brightener therein is simply applied on the upper surface 14b of the pointer 14. In this case, of course, the width of the coating 20 is narrower than that of the base member 14a of the pointer 14. This also means that the area of the fluorescent part is smaller than that of the upper surface of the pointer 14.

According to these embodiments, during day-time, the pointer 14 is visually recognized by a driver with the width of the base member 14a of the pointer 14, because the fluorescent part 20 is formed from the coating having the same color as that of, the pointer. On the other hand, during night-time when the ultraviolet lamp is turned on, only the fluorescent part 20 of the pointer 14 fluoresce by receiving an ultraviolet light, whose width is narrower than that of the pointer 14, thus providing a suitable visibility to a driver.

Further, according to the embodiments described above, the ground color of the scale part 12 is black and the color of the fluorescent part 20 of the pointer 14 is the same as that of the pointer 14, namely silver, the color of aluminum. However, if the ground color of the scale plate is white, it is possible to apply a normal, non-fluorescent black paint onto the upper surface of the pointer 14 and a black fluorescent brightener which constitutes a fluorescent part is painted over a portion of the black paint applied onto the upper surface of the pointer 14.

Furthermore, the color of the fluorescent brightener is not limited to the colors as described above. A transparent fluorescent brightener can be used.

Figure 9:
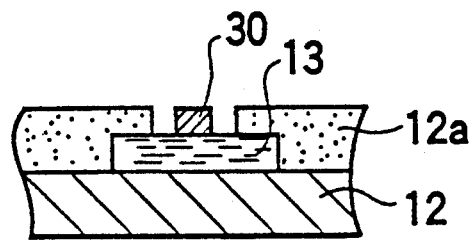
FIG. 9 is a cross-sectional view of one embodiment of indicia according to the present invention.
Figure 10:
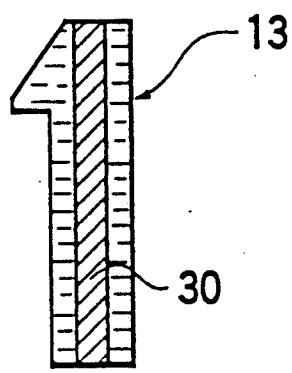
FIG. 10 is a schematic view of the indicia of FIG. 9.

FIG. 9 shows an embodiment of indicia according to the present invention. In the drawing, on the scale plate 12, there is arranged indicia 13 such as Arabic numeral 1 is printed in a white normal ink and there is applied a black ground color painting 12a in such a manner that the edges of the indicia 13 is partially coated therewith so as not to expose the basic material of the scale plate 12, thereby a contour of the numeral being defined. On the indicia 13, there is formed a fluorescent part 30 which is formed from a white fluorescent brightener. As clearly illustrated in FIG. 10, the width of the fluorescent part 30 is narrower than that of the indicia 13. This means that the area of the fluorescent part is smaller than that of the indicia.

Figure 11:
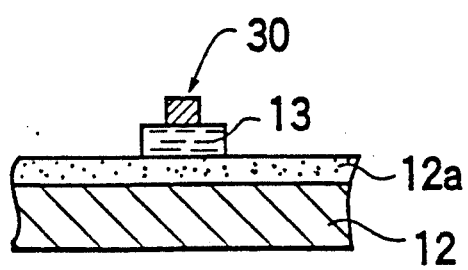
FIG. 11 is a cross-sectional view of a modification of the indicia of FIG. 9.

FIG. 11 shows a modification of the embodiment of FIG. 9. As shown in the drawing, in this embodiment, the upper surface of the scale plate 12 is coated with a black ground color painting 12a, on which indicia 13 are printed in a normal ink. On the indicia 13, there is formed a fluorescent part 30 whose width is narrower than that of the indicia 13. Thus formed indicia 13 has substantially the same function as that of the embodiment shown in FIG. 10.

According to these embodiments, during the daytime the indicia 13 is visually recognized by a driver with the entire width of the indicia 13, because the fluorescent part 30 is formed from the ink having the same color as that of the indicia 13. On the other hand, during night-time when the ultraviolet lamp 18 is turned on, only the fluorescent part 30 on the indicia 13 fluoresce by receiving an ultraviolet light. In this case, the width of the fluorescent part 30 is narrower than that of the indicia 13, thus providing a suitable visibility to a driver.

Figure 12:
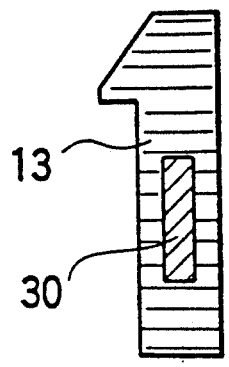
FIG. 12 is a schematic view of another embodiment of indicia according to the present invention.

FIG. 12 shows another embodiment of the indicia according to the present invention. As shown in the drawing, it is possible to form the fluorescent part 30 in such a manner that not only the width thereof but also the length thereof are smaller than those of the indicia 13.

Figure 13:
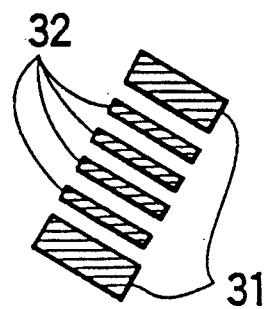
FIG. 13 is a schematic view of yet another embodiment of indicia according to the present invention.

FIG. 13 shows yet another embodiment of the present invention. In this embodiment, indicia such as scales comprises a combination of one large width scale 31 and four small width scales 32. The large width scale 31 is printed in an ink which contains fluorescent brightener therein and has a color distinguishable from the ground color of the scale plate 12 and the small width scales 32 are printed in a normal ink which contains no fluorescent brightener therein and has a color distinguishable from the ground color.

According to this embodiment, under day-light, all scales 31 and 32 can be visually recognized to a driver, but under darkness only the large width scale 31 can be recognized under the illumination of the ultraviolet light. As a result, it is possible to avoid exceeding bright and distracting of the scales under the illumination of the ultraviolet light and to enjoy change of arrangement of the indicia 13 between night-time and day-time.

It must be understood that the invention is in no way limited to the above embodiments and that many changes may be brought about therein without departing from the scope of the invention as defined by the appended claims.

What is claimed is:

1. An indicator, comprising:

a scale plate having a certain ground color;

a pointer rotatably mounted on said scale plate, said pointer including an upper surface having an area in which a fluorescent part comprising a fluorescent brightener is formed therein, and said area of the fluorescent part of said pointer being less than that of the upper surface of the pointer;

indicia such as numerals and scales arranged on said scale plate for indicating a specific value in cooperation with said pointer, each of said indicia having a contour defined by a non-fluorescent ink having a different color from said ground color of said scale plate, a fluorescent part having an area and comprising a fluorescent brightener formed within said contour of each indicia, and said area of said indicia fluorescent part being less than that of said indicia; and an ultraviolet light source for illuminating said pointer and indicia fluorescent parts so as to fluoresce only when said ultraviolet light source is turned on, whereby said pointer and indicia fluorescent part areas are less than said pointer and indicia areas so as to reduce brightness and minimize distraction for a driver when illuminated by said ultraviolet light source.

2. The indicator as claimed in claim 1, wherein each of said pointer and said fluorescent part of said pointer has a certain width, respectively, and said width of said fluorescent part of said pointer is narrower than said width of said pointer.

3. The indicator as claimed in claim 2, wherein said pointer is comprised of a material having a certain color which is distinguishable from said ground color of said scale plate, and said fluorescent brightener of said fluorescent part of said pointer has the same color as that of said material of said pointer.

4. The indicator as claimed in claim 3, wherein said fluorescent part of said pointer comprises a coating of fluorescent brightener applied onto said upper surface of said pointer, and said coating is made by means of processes taken from the group consisting of hot-stamping, printing or painting.

5. The indicator as claimed in claim 4, wherein a longitudinal and convex protrusion having a top surface and having a width narrower than that of said pointer is formed on said upper surface of said pointer, and said fluorescent part of said pointer is provided on said top surface of said protrusion.

6. The indicator as claimed in claim 2, wherein said upper surface of said pointer has a substantially flat surface, and said fluorescent part of said pointer is provided on said upper surface.

7. The indicator as claimed in claim 1, wherein each of said contour of said indicia and said fluorescent part of said indicia has a certain width, respectively, and said width of said fluorescent part of said indicia is narrower than that of said contour of said indicia.

8. The indicator as claimed in claim 7, wherein each of said contour of said indicia and said fluorescent part of said indicia has a certain length, and said width and length of said fluorescent part of said indicia are less than those of said contour of said indicia, respectively.

9. The indicator as claimed in claim 7 wherein said indicia are printed in an ink having a certain color which is distinguishable from said ground color of said scale plate, and said fluorescent brightener of said fluorescent part of said indicia as the same color as that of said ink of said indicia.

10. The indicator as claimed in claim 8, wherein said indicia are printed in an ink having a certain color which is distinguishable from said ground color of said scale plate, and said fluorescent brightener of said fluorescent part of said indicia has the same color as that of said ink of said indicia.

11. An indicator, comprising:

a scale plate having a ground color;

a pointer, rotatably mounted on said scale plate, comprising an upper surface having a pointer width including a fluorescent width coated with a fluorescent brightener, said fluorescent width narrower than said pointer width, said pointer width and said fluorescent width having the same color, said color distinguishable from said scale plate ground color;

indicia means arranged on said scale plate for indicating a specific value in cooperation with said pointer, each of said indicia means having an indicia contour defined by a non-fluorescent ink having a contour width, said indicia contour having an indicia fluorescent width coated with a fluorescent brightener, said indicia fluorescent width narrower than said contour width, said contour width and said indicia fluorescent width having the same color, said color distinguishable from said ground color;

an ultraviolet light source for illuminating said pointer and indicia fluorescent widths so as to fluoresce only when said ultraviolet light source is turned on, whereby said pointer and indicia fluorescent widths are less than said pointer and indicia widths so as to reduce brightness and minimize distraction for a driver when illuminated by said ultraviolet light source.

* * * * *